(12) United States Patent
Santillo et al.

(10) Patent No.: US 11,584,466 B2
(45) Date of Patent: *Feb. 21, 2023

(54) VERTICAL NON-LINEAR AUTOMOTIVE ASSEMBLY

(71) Applicant: Ford Global Technologies, LLC, Dearborn, MI (US)

(72) Inventors: Mario Anthony Santillo, Canton, MI (US); Lorne Forsythe, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,801

(22) Filed: Nov. 30, 2021

(65) Prior Publication Data

US 2022/0234664 A1 Jul. 28, 2022

Related U.S. Application Data

(63) Continuation of application No. 17/157,666, filed on Jan. 25, 2021, now Pat. No. 11,214,321.

(51) Int. Cl.
| | |
|---|---|
| *B62D 65/18* | (2006.01) |
| *B62D 65/02* | (2006.01) |
| *E04H 5/02* | (2006.01) |
| *B23P 21/00* | (2006.01) |

(52) U.S. Cl.
CPC ............ *B62D 65/18* (2013.01); *B23P 21/004* (2013.01); *B62D 65/022* (2013.01); *E04H 5/02* (2013.01); *B23P 2700/50* (2013.01)

(58) Field of Classification Search
CPC .... B23P 21/004; B23P 2700/50; B62D 65/18; B62D 65/022; E04H 5/02
See application file for complete search history.

(56) References Cited

U.S. PATENT DOCUMENTS

2009/0056116 A1* 3/2009 Presley ............ H01L 21/67167
29/791
2018/0171653 A1* 6/2018 Birch ........................ E04H 5/02

* cited by examiner

*Primary Examiner* — Matthew P Travers
(74) *Attorney, Agent, or Firm* — Burris Law, PLLC

(57) ABSTRACT

A control system for controlling a plurality of manufacturing capsules in a manufacturing system for assembling a vehicle includes a processor and a nontransitory computer-readable medium comprising instructions that are executable by the processor. The instructions include generating vehicle assembly instructions based on the vehicular manufacturing process, one or more selected levels from among the plurality of levels, and one or more selected manufacturing cells disposed at the one or more selected levels, defining a nominal path based on the one or more selected manufacturing cells and the one or more selected levels, and controlling movement of the manufacturing capsules based on the nominal path.

20 Claims, 7 Drawing Sheets

VERTICAL NON-LINEAR AUTOMOTIVE ASSEMBLY

CROSS-REFERENCE TO RELATED APPLICATION

This application is a continuation of and claims the benefit of U.S. application Ser. No. 17/157,666, filed Jan. 25, 2021, and titled "VERTICAL NON-LINEAR AUTOMOTIVE ASSEMBLY," the contents of which are incorporated herein by reference in its entirety.

FIELD

The present disclosure relates to a configuration of an automotive assembly process.

BACKGROUND

The statements in this section merely provide background information related to the present disclosure and may not constitute prior art.

A vehicle manufacturing environment may include an assembly line in which a vehicle workpiece transitions between various stations during a manufacturing process. However, vehicle manufacturing environments are limited to two-dimensional layouts, unable to adapt to design variations, and require large physical footprints and/or areas to efficiently manufacture the vehicle.

These issues with vehicle manufacturing environments, among other issues with vehicle manufacturing environments, are addressed by the present disclosure.

SUMMARY

This section provides a general summary of the disclosure and is not a comprehensive disclosure of its full scope or all of its features.

The present disclosure provides control system for controlling a plurality of manufacturing capsules in a manufacturing system for assembling a vehicle, the manufacturing system including a structure having a plurality of levels and including a plurality of manufacturing cells distributed among the plurality of levels, the manufacturing system including the plurality of manufacturing capsules disposable at the plurality of manufacturing cells and configured to support a vehicular manufacturing process to assemble the vehicle, where the vehicular manufacturing process includes a plurality of manufacturing operations, the manufacturing system including a transport system configured to move the plurality of manufacturing capsules to the plurality of manufacturing cells, where the transport system includes a vertical transport system configured to longitudinally move the plurality of manufacturing capsules between the plurality of levels. The control system includes a processor and a nontransitory computer-readable medium comprising instructions that are executable by the processor. The instructions include generating vehicle assembly instructions based on the vehicular manufacturing process, one or more selected levels from among the plurality of levels, and one or more selected manufacturing cells disposed at the one or more selected levels, defining a nominal path based on the one or more selected manufacturing cells and the one or more selected levels, and controlling movement of the manufacturing capsules based on the nominal path.

In one form, the instructions further comprise controlling the movement of the manufacturing capsules based on vehicle assembly sequence instructions. In one form, the vehicle assembly sequence instructions define the plurality of manufacturing operations of the vehicular manufacturing process and one or more levels from among the plurality of levels for performing the plurality of manufacturing operations. In one form, the vehicle assembly sequence instructions identify a first manufacturing cell from among one or more levels of the plurality of levels for performing a first manufacturing operation of the plurality of manufacturing operations. In one form, the vehicle assembly sequence instructions define a path between the first manufacturing cell and one or more additional manufacturing cells for performing additional manufacturing operations of the plurality of manufacturing operations. In one form, the path is based on a comparison between a cycle time of a given manufacturing operation from among the plurality of manufacturing operations to a threshold cycle time of the given manufacturing operation. In one form, the instructions further comprise controlling the movement of the manufacturing capsules based on a collision avoidance routine. In one form, the vehicle assembly instructions are based on a model of the vehicle, a trim of the vehicle, a hierarchal relationship between the vehicle and one or more additional vehicles, or a combination thereof. In one form, the nominal path is based on the hierarchal relationship between the vehicle and the one or more additional vehicles. In one form, the one or more selected manufacturing cells include a plurality of selected manufacturing cells, and where the nominal path is based on a distance between the plurality of selected manufacturing cells, an aggregate cycle time of the plurality of manufacturing operations, an availability of the plurality of selected manufacturing cells, or a combination thereof. In one form, the instructions further comprise controlling the movement of the manufacturing capsules based on cycle time data of the one or more selected manufacturing cells.

The present disclosure provides a method for controlling a plurality of manufacturing capsules to assemble a vehicle in a manufacturing system, the manufacturing system including a structure having a plurality of levels and including a plurality of manufacturing cells distributed among the plurality of levels, the manufacturing system including the plurality of manufacturing capsules disposable at the plurality of manufacturing cells and configured to support a vehicular manufacturing process to assemble the vehicle, where the vehicular manufacturing process includes a plurality of manufacturing operations, the manufacturing system including a transport system configured to move the plurality of manufacturing capsules to the plurality of manufacturing cells, where the transport system includes a vertical transport system configured to longitudinally move the plurality of manufacturing capsules between the plurality of levels. The method includes generating vehicle assembly instructions based on the vehicular manufacturing process, one or more selected levels from among the plurality of levels, and one or more selected manufacturing cells disposed at the one or more selected levels, defining a nominal path based on the one or more selected manufacturing cells and the one or more selected levels, and controlling movement of the manufacturing capsules based on the nominal path.

In one form, the method includes controlling the movement of the manufacturing capsules based on vehicle assembly sequence instructions. In one form, the method includes controlling the movement of the manufacturing capsules based on a collision avoidance routine. In one form, the method further includes controlling the movement of the manufacturing capsules based on cycle time data of the one or more selected manufacturing cells.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
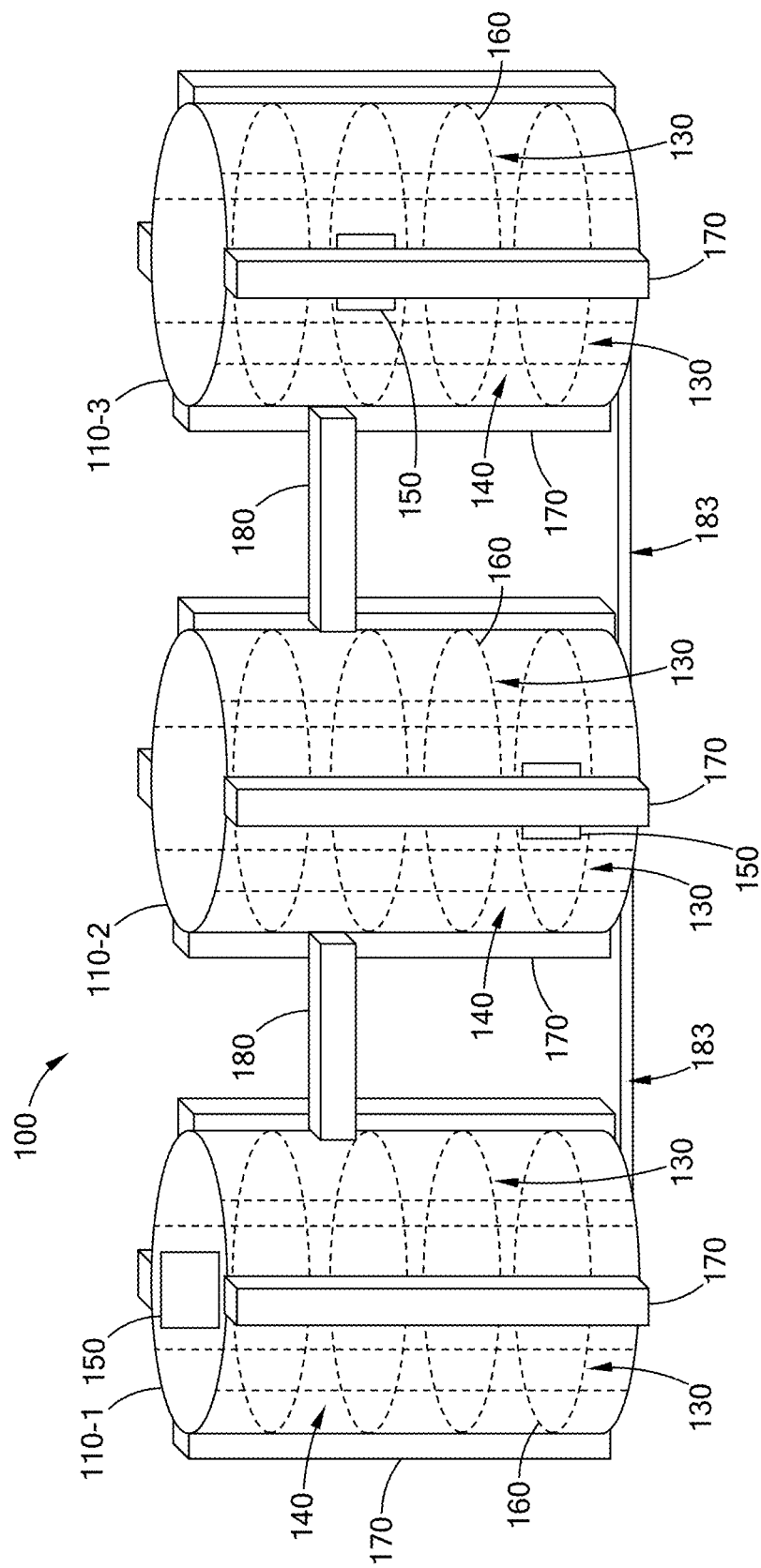
FIG. 1 illustrates a schematic view of an example cylindrical structure having a plurality of levels in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides for a manufacturing system that is a nonlinear manufacturing system for assembling a vehicle. More particularly, as described herein, the manufacturing system includes a multi-level structure and manufacturing cells distributed among the levels of the multi-level structure. Manufacturing capsules are disposed among the manufacturing cells and configured to support a vehicular manufacturing process to assemble the vehicle. The manufacturing system includes one or more vertical and horizontal transport systems that collectively move the manufacturing capsules to and from the manufacturing cells and between the plurality of levels. A control system performs, for example, anticollision and autonomous movement routines to control the movement of the manufacturing capsules. As such, the manufacturing system of the present disclosure may have a smaller physical footprint than that of traditional manufacturing facilities/systems. In addition, the manufacturing system provides for a dynamic and adaptable vehicle manufacturing process that can account for design variations, quality issues, among other factors.

Referring to FIG. 1, a manufacturing system 100 for manufacturing a vehicle or a vehicle part includes structures 110-1, 110-2, 110-3 (collectively referred to as "structures 110"). In one form, the structures 110 each have a plurality of levels 130 and a plurality of manufacturing cells 140 distributed among the plurality of levels 130. In one form, a plurality of manufacturing capsules 150 are disposed at one or more of the manufacturing cells 140 and are configured to support a vehicular manufacturing process to assemble the component. The vehicular manufacturing process includes various manufacturing operations. As used herein, "manufacturing operations" refer to manufacturing processes in which a workpiece (e.g., the vehicle) is subjected to an operation using the one or more automated tools. Example manufacturing operations include, but are not limited to: installing batteries, electric motors, suspensions, gas tanks, rear axles and drive shafts, gear boxes, steering box components, wheel drums, and braking systems to a chassis; assembling the body and the interior of the vehicle; mating the body and the chassis; and/or performing an inspection operation (e.g., a quality control routine, an end-of-line (EOL) testing routine, among others).

Figure 2:
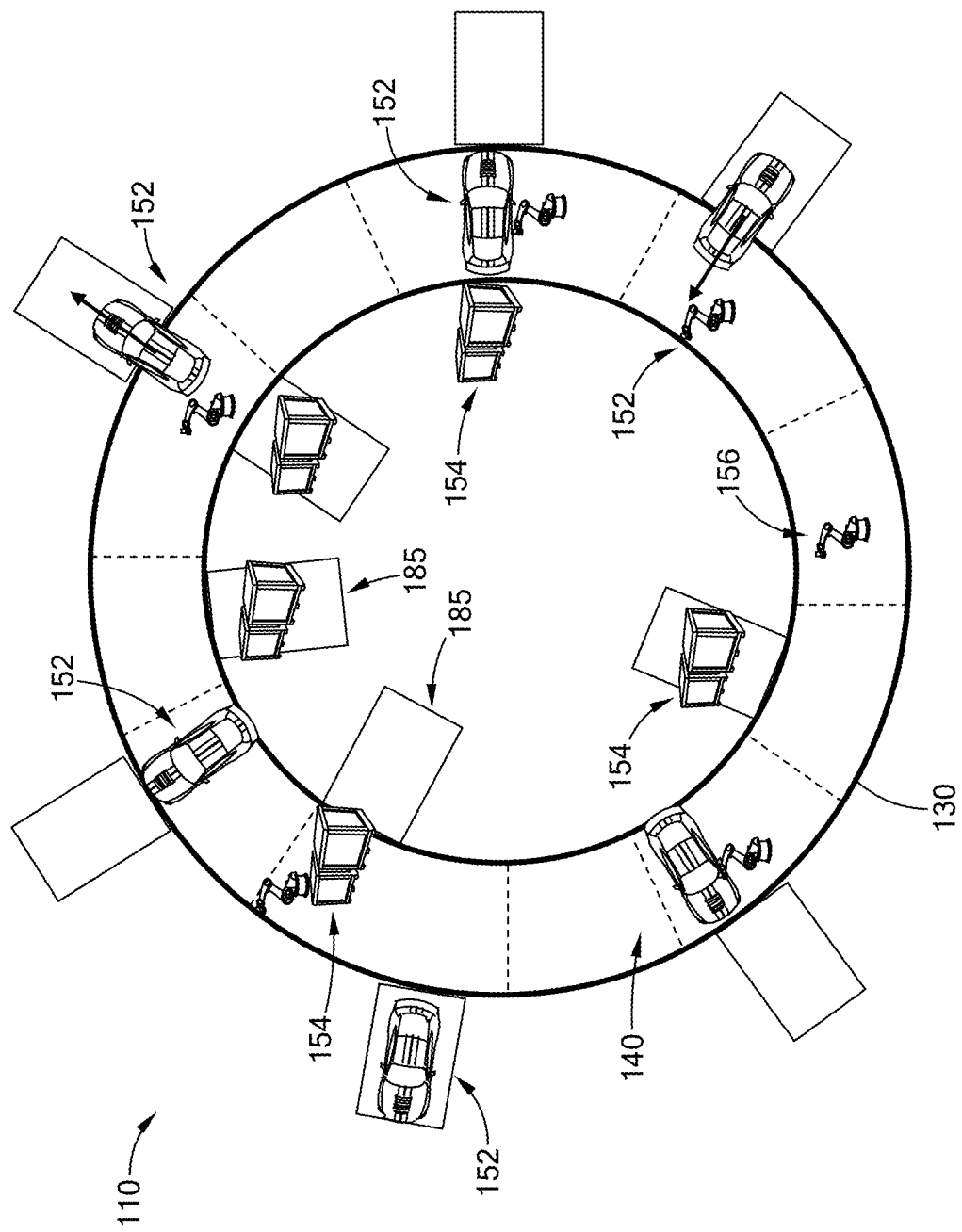
FIG. 2 illustrates a schematic top view of a plurality of manufacturing capsules disposed at a plurality of manufacturing cells of a cylindrical structure in accordance with the teachings of the present disclosure.

Referring to FIG. 2, the manufacturing cells 140 are defined regions of the structure 110 in which the manufacturing capsules 150 are disposed at during a manufacturing operation. In one form, the manufacturing cells 140 may include a frame defining a volume and/or geometry such that the manufacturing capsules 150 can be positioned within the manufacturing cells 140. In one form, the manufacturing cells 140 may include various systems (e.g., electrical power systems, attachment mechanisms, controllers, among others) for moving the manufacturing capsules 150 into and out of the manufacturing cells 140 and supporting operations performed by the manufacturing capsules 150 (e.g., electrical power to power robotic systems of the capsules).

In one form, the manufacturing capsules 150 are configured to transport components utilized during the manufacturing operations. In one form, the manufacturing capsules are open-ended or closed structures that are defined by a frame and have a shape or geometry that enable the manufacturing capsules 150 to be positioned within the manufacturing cells 140. In one form, the manufacturing capsules 150 may include workpiece capsules 152, supply capsules 154, and inspection capsules 156. In one form, the workpiece capsules 152 are configured to perform one or more manufacturing operations and thus, may include a workpiece and one or more automated tools (e.g., robots, stamping tools, machining tools, among others).

In one form, the supply capsules 154 are configured to transport manufacturing materials to the manufacturing cells 140. As an example, the manufacturing materials may include, but are not limited to: materials used to support a manufacturing operation (e.g., a fixture, a table, a conveyor, among others) and a workpiece (e.g., a fender, pumps, wheels, among others).

In one form, the inspection capsules 156 include an inspection system configured to perform a vehicle testing operation and/or an inspection operation. As an example, the inspection system may include a computing system and hardware for performing a vehicle EOL testing routine. As another example, the inspection system may include, but is not limited to, acoustic inspection systems that utilize acoustic sensors to determine whether an anomalous state exists within the manufacturing cell 140, image inspection systems that utilize image sensors to perform known image processing routines (e.g., a difference-based image processing routine, a semantic-based image processing routine, among others) on image data obtained from the manufacturing cell 140 to determine whether an anomalous state exists, and other environment inspection systems. Example inspection systems are described in U.S. patent application Ser. No. 17/091,794 titled "COLLECTIVE ANOMALY DETECTION SYSTEMS AND METHODS," which is commonly owned with the present application and the contents of which are incorporated herein by reference in its entirety.

Referring to FIGS. 1-2, the manufacturing system 100 may include a transport system configured to move the manufacturing capsules 150 to the plurality of manufacturing cells 140. As an example, the structures 110 may include horizontal transport systems 160 that transversely move the manufacturing capsules 150 at a given level 130. As another example, the structures 110 include vertical transport systems 170 that are configured to longitudinally move the manufacturing capsules 150 between the levels 130. While the vertical transport systems 170 are illustrated as part of an exterior of the structure 110, the vertical transport systems may also be provided within the structure 110. As an additional example, the manufacturing system 100 includes structure transport systems 180 that transversely move the manufacturing capsules 150 among the structures 110. As yet another example, the manufacturing system 100 includes ground level transport systems 183 that transversely move and/or provide a path for transversely moving the manufacturing capsules 150 among the structures 110.

In one form, the transport systems may be configured to transport a specific type of manufacturing capsule 150. For example, one or more vertical transport systems may be configured to only transport supply capsules to the plurality of manufacturing cells 140 (e.g., supply vertical transport systems 185 in FIG. 2). The horizontal transport systems 160, the vertical transport systems 170, the structure transport systems 180, and the supply vertical transport systems 185 are collectively referred to hereinafter as "transport systems." As described below in further detail with reference to FIG. 7, a control system is configured to control the movement of the manufacturing capsules 150 via the transport systems.

In one form, the transport systems are implemented by elevator platforms and/or automated guided vehicles (AGVs) that move the manufacturing capsules 150 to and from the manufacturing cells 140 vertically/horizontally using a rail system. In one form, the transport systems are implemented by mobile robots, drones, and/or autonomous devices that move the manufacturing capsules 150 to the manufacturing cells 140 vertically/horizontally within the structures 110. In some forms, the transport systems include various movement systems (e.g., propulsion systems, steering systems, and/or brake systems) to move the manufacturing capsules 150 and one or more processor circuits that are configured to execute machine-readable instructions stored in one or more nontransitory computer-readable mediums, such as a random-access memory (RAM) circuit and/or read-only memory (ROM) circuit. The transport systems may also include other components for performing the operations described herein, such as, but not limited to, movement drivers and systems, transceivers, routers, and/or input/output interface hardware.

It should be understood that any number of structures 110, levels 130, manufacturing cells 140, manufacturing capsules 150, and/or transport systems may be included within the manufacturing system 100 and is not limited to the example described herein.

Figure 3:
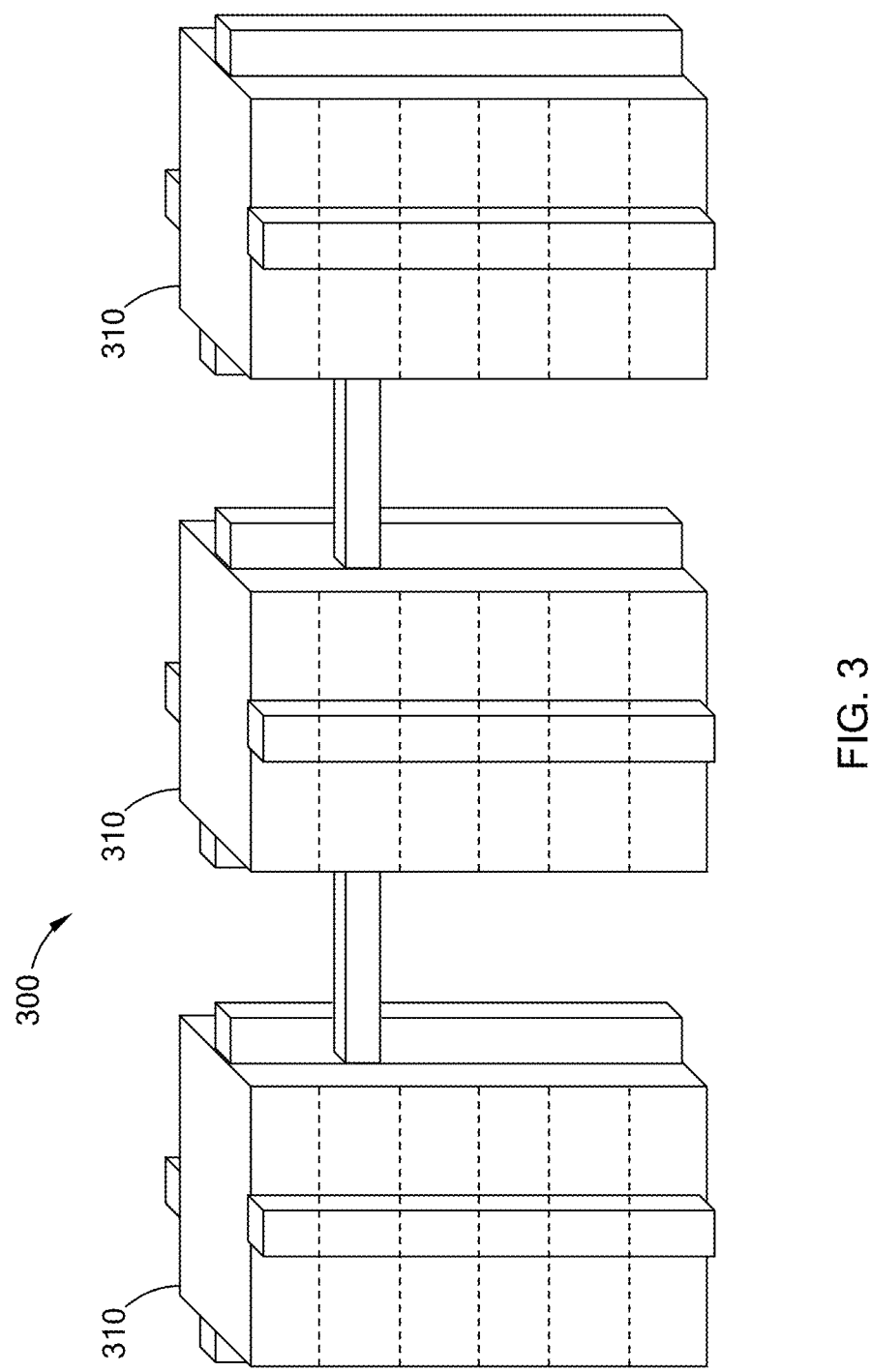
FIG. 3 illustrates a schematic view of an example rectangular structure having a plurality of levels in accordance with the teachings of the present disclosure.

Referring to FIG. 3, another manufacturing system 300 is shown. The manufacturing system 300 is similar to the manufacturing system 100, except that structure 310 is configured to have a cuboid like shape as opposed to the cylindrical shape of structure 110. The description of various components of the manufacturing system 300, which is similar to the manufacturing system 100, is omitted for the sake of brevity.

Figure 4:
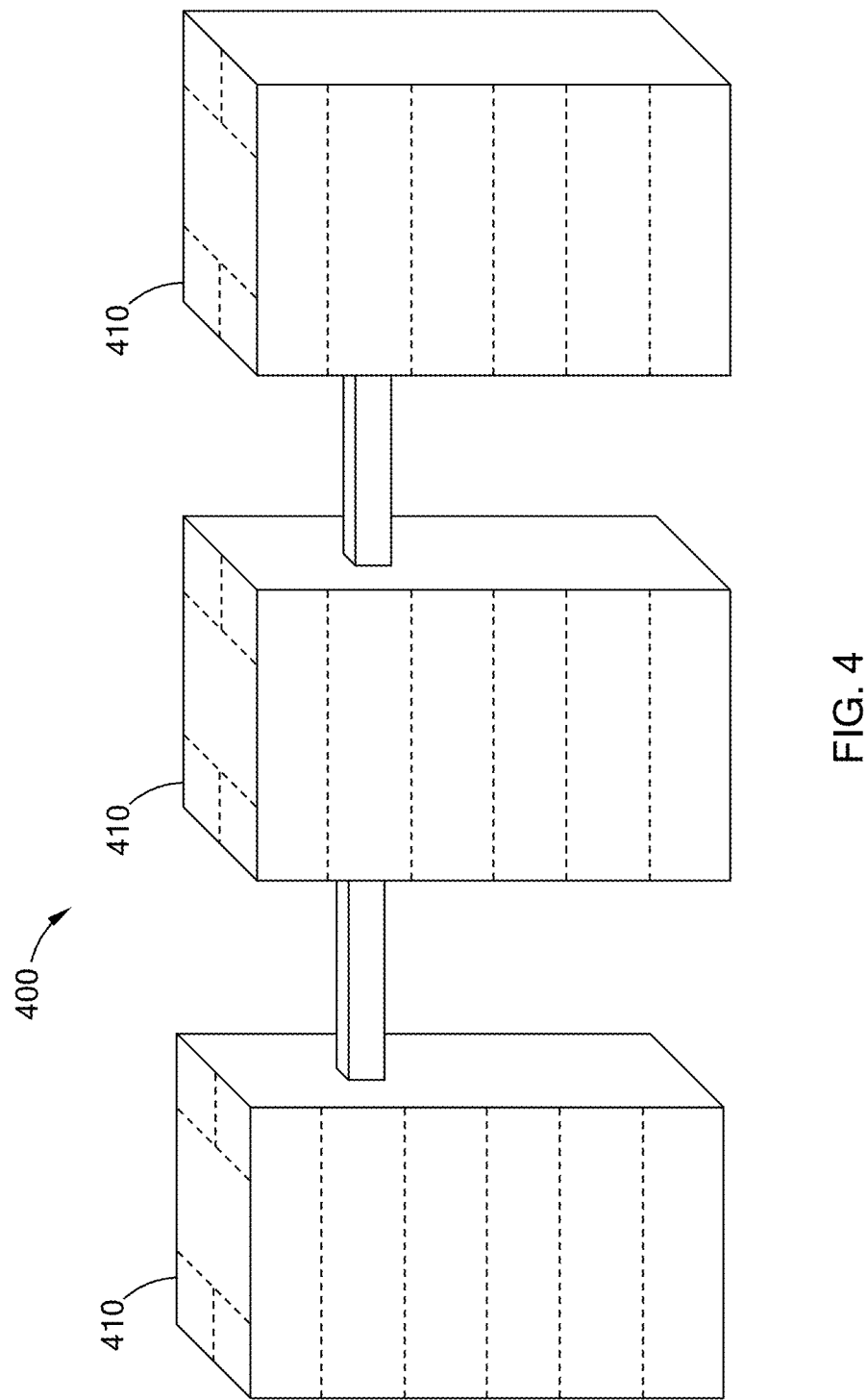
FIG. 4 illustrates a schematic view of another example rectangular structure having a plurality of levels in accordance with the teachings of the present disclosure.

Referring to FIG. 4, another manufacturing system 400 is shown. The manufacturing system 400 is similar to the manufacturing system 300, except that the horizontal transport system 160 and the vertical transport system 170 are located within the structures 410. The description of various components of the manufacturing system 400, which is similar to the manufacturing system 100, is omitted for the sake of brevity.

Figure 5:
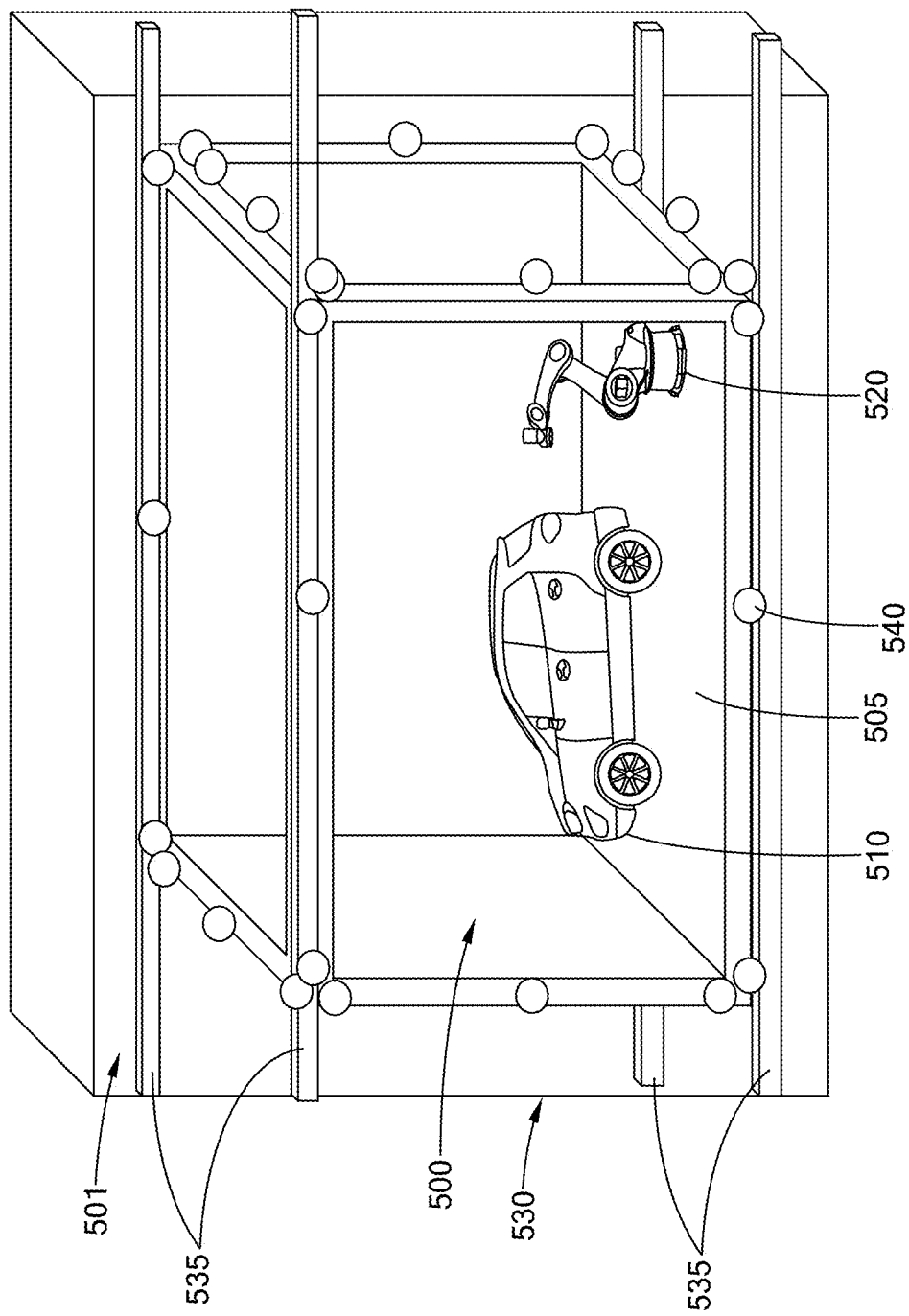
FIG. 5 illustrates a schematic view of an example manufacturing cell and manufacturing capsule in accordance with the present disclosure.

Referring to FIG. 5, an example of a workpiece capsule 500 disposed at a manufacturing cell 501 and a horizontal transport system 530 is shown. The workpiece capsule 500, the manufacturing cell 501, and the horizontal transport system 530 can be employed as part of the manufacturing systems 100, 300, 400. In one form, the workpiece capsule 500 includes an elevator platform 505 that supports a workpiece 510 and a robot 520, and the horizontal transport system 530 includes rails 535 and wheels 540 attached/secured to the workpiece capsule 500. In one form, the workpiece capsule 500 is configured to move horizontally along the rails 535 using the wheels 540. While FIG. 5 illustrates one workpiece capsule 500, it should be understood that other workpiece capsules 500 may have similar configurations such that the other workpiece capsules 500 are moveable along the horizontal transport system 530. It should be understood that the workpiece capsule 500 may have other configurations in other forms and is not limited to the configuration described herein. It should also be understood that other transport systems described herein may include similar rails for moving the workpiece capsule 500 using the wheels 540. As described below in further detail with reference to FIG. 7, a control system is configured to control the movement of workpiece capsule 500 along the horizontal transport system 530.

Figure 6:
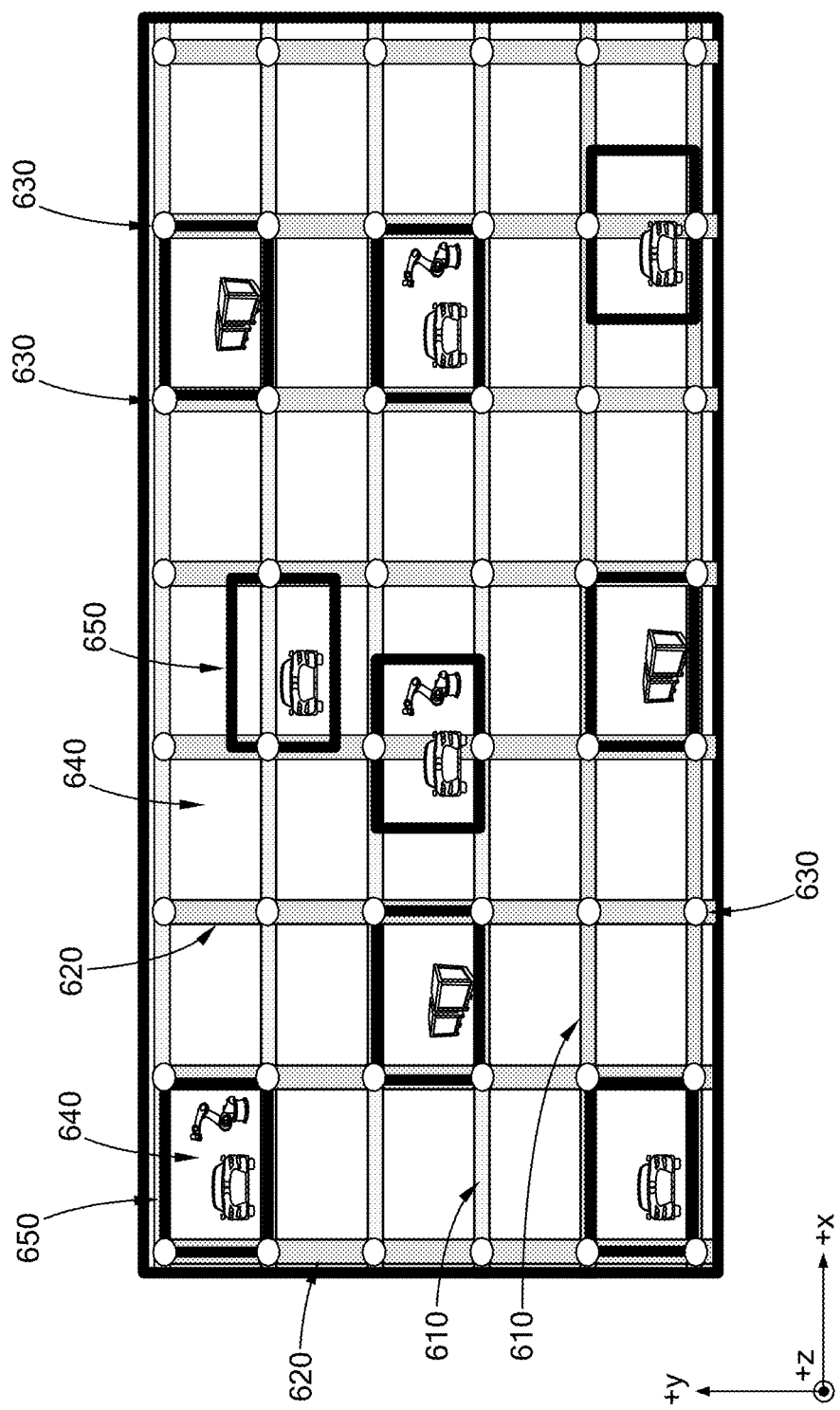
FIG. 6 illustrates a schematic view of example transition nodes of a structure in accordance with the teachings of the present disclosure.

Referring to FIG. 6, an example of a horizontal transport system 610, a vertical transport system 620, and a workpiece capsule 650 disposed at a manufacturing cell 640 is shown. The horizontal transport system 610, the vertical transport system 620, the manufacturing cell 640, and the workpiece capsule 650 can be employed as part of the manufacturing systems 100, 300, 400. In one form, the horizontal transport system 610 and the vertical transport system 620, which are implemented by rail systems, are connected at transition nodes 630 and are configured to move between each other at the transition nodes 630. In one form, the transition nodes 630 include horizontal/vertical elevator switching systems and mechanisms configured to switch the manufacturing capsules 650 between the horizontal transport system 610 and the vertical transport system 620. In one form, the transition nodes 630 include loading systems and mechanisms configured to load the workpiece capsule 650 into and remove the workpiece capsule 650 from the manufacturing cells 640 (that is, the transition nodes 630 are configured to load/remove the workpiece capsule 650 to/from the manufacturing cells 640 in the ±Z direction). It should be understood that an additional transition node 630 may be disposed at an area proximate to an intersection between the structure transport system 180 (not shown) and at least one of the horizontal transport system 610 and the vertical transport system 620.

Figure 7:
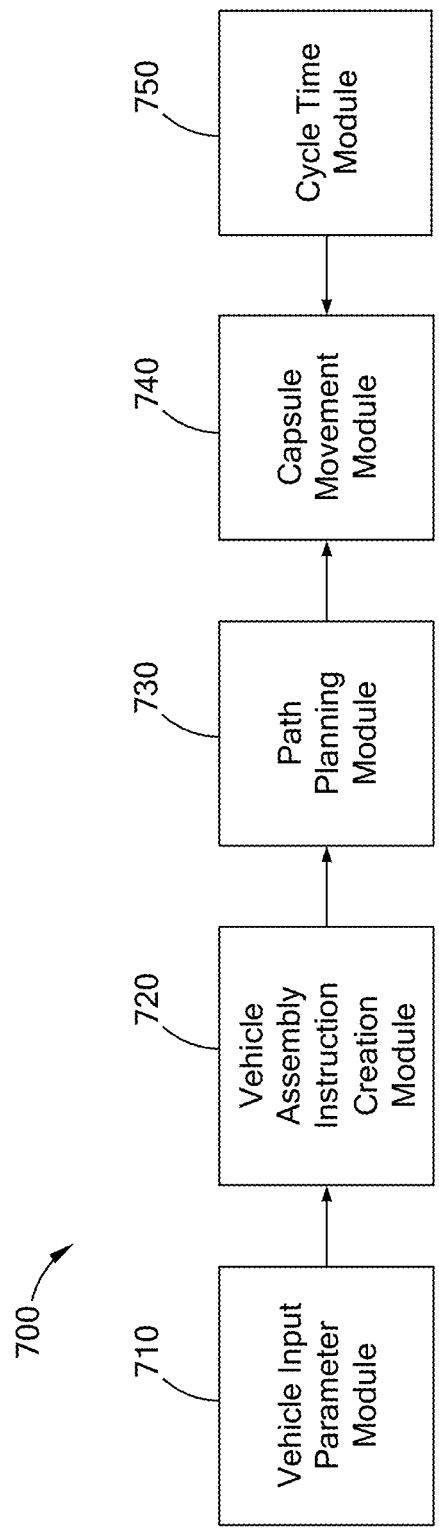
FIG. 7 illustrates a functional block diagram of a control system in accordance with the teachings of the present disclosure.

Referring to FIG. 7, in one form, the manufacturing systems 100, 300, 400 include a control system 700 that is configured to control the movement of the manufacturing capsules 150 within the transport systems. In one form, the control system 700 and the transport systems are communicably coupled using any suitable wireless communication protocol (e.g., a Bluetooth®-type protocol, a cellular protocol, a wireless fidelity-type (WiFi-type) protocol, a near-field communication (NFC) protocol, an ultra-wideband (UWB) protocol, among others).

In one form, the control system 700 may include a vehicle input parameter module (VIPM) 710, a vehicle assembly instruction creation module (VAICM) 720, a path planning module (PPM) 730, a capsule movement module (CMM) 740, and a cycle time module (CTM) 750. The components of the control system 700 can be provided at the same location or distributed at different locations and communicably coupled accordingly. To perform the functionality described herein, the control system 700 may include one or more processor circuits that are configured to execute machine-readable instructions stored in one or more non-transitory computer-readable mediums, such as a RAM circuit and/or ROM circuit. The control system 700 may also include other components for performing the operations described herein such as, but not limited to, movement drivers and systems, transceivers, routers, and/or input/output interface hardware.

In one form, the VIPM 710 receives inputs corresponding to various design parameters of a vehicle to be manufactured. The inputs may include, but are not limited to: a vehicle model, a vehicle trim, design variations, and a hierarchal relationship between the vehicle and other vehicles being manufactured currently or at a later time. In one form, the VIPM 710 is a dynamic manufacturing control system that defines an automated operation to be performed on a workpiece, selects manufacturing materials for the workpiece based on the manufacturing operations, and selects a time and/or location (e.g., a given level 130 and/or manufacturing cell 140) for performing the manufacturing operations. Example dynamic manufacturing control systems are described in U.S. patent application Ser. No. 17/063,291 titled "SYSTEM AND METHOD FOR GENERATING DYNAMIC MANUFACTURING PROCESS SEQUENCES," which is commonly owned with the present application and the contents of which are incorporated herein by reference in its entirety.

In one form, the VAICM 720 generates vehicle assembly instructions based on the inputs. The vehicle assembly instructions may define the manufacturing operations of the vehicular manufacturing process, one or more levels 130 in which the manufacturing operations are performed, and/or various transport systems utilized to transport corresponding manufacturing capsules 150 to/from the manufacturing cells 140. As an example, the vehicle assembly instructions may include assigning a first manufacturing cell 140 on a first level 130 for a first manufacturing operation and instructing one of the workpiece capsules 152 to provide a workpiece and a robot to the first manufacturing cell for performing the first manufacturing operation. Furthermore, the vehicle assembly instructions may include additional manufacturing operations, additional manufacturing cells 140 and/or levels 130 for performing the additional manufacturing operations, and additional designated manufacturing capsules 150 for transporting the corresponding supplies for performing the additional manufacturing operations.

In one form, the PPM 730 is configured to define a nominal path between the first manufacturing cell 140 and the additional manufacturing cells 140. In one form, the PPM 730 may define a nominal path based on a distance between the first manufacturing cell and the additional manufacturing cells 140, an aggregate cycle time of the manufacturing operations defined by the vehicle assembly instructions, an availability of the additional manufacturing cells 140, and/or the hierarchal relationship indicated by the VIPM 710. As an example, in response to an input indicating that the vehicle is a "high priority vehicle" relative to other vehicles being manufactured, the PPM 730 may define the nominal path corresponding to a reduced aggregate cycle time. As another example, the PPM 730 may define the nominal path based on known graph-based path planning routine, such as, but not limited to: Djikstra's graph-based path planning routine and/or Grassfire graph-based path planning routine. As an additional example, if the aggregate cycle time is greater than a threshold value, the PPM 730 may define the nominal path to be within only one level 130 (and thereby inhibit additional bottlenecks caused by the path traversing through multiple levels 130).

In one form, the CMM 740 is configured to control the movement of the manufacturing capsules 150 based on the nominal path. As an example, the CMM 740 is configured to perform known collision avoidance routines, such as, but not limited to: model predictive control-based routines and mixed-integer programming-based routines. As such, the CMM 740 may adjust the nominal path to a subsequent level 130 and/or manufacturing cell 140 based on one or more results of the collision avoidance routines.

In one form, the CMM 740 is configured to control the movement of the manufacturing capsules 150 based on cycle time data obtained from the CTM 750. In one form, the cycle time data indicates current cycle time of a manufacturing process performed on a workpiece at a given manufacturing cell 140. As an example, the CMM 740 may adjust the nominal path to a new level 130 and/or manufacturing cell 140 if the current cycle time of a manufacturing process exceeds an estimated cycle time for the given manufacturing process.

Accordingly, the present disclosure provides for nonlinear, three-dimensional manufacturing system that have a smaller physical footprint compared to traditional manufacturing facilities/systems. Furthermore, the reduced physical footprint enables the manufacturing systems to be included in unconventional areas (e.g., a skyscraper in an urban environment). Additionally, the nonlinear, three-dimensional manufacturing system provides for inhibited use of pass-through structures of a conventional assembly line process, as the vehicle manufacturing process can be carried out using a single manufacturing capsule that moves to and from the various levels/manufacturing cells of the structure.

Furthermore, the control system is configured to selectively control the movement of the manufacturing capsules between the levels and various manufacturing cells of the nonlinear manufacturing system. As such, the control system provides for a dynamic and adaptable vehicle manufacturing process that can account for design variations, quality issues, among other factors.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A control system for controlling a plurality of manufacturing capsules in a manufacturing system for assembling a vehicle, the manufacturing system including a structure having a plurality of levels and including a plurality of manufacturing cells distributed among the plurality of levels, the manufacturing system including the plurality of manufacturing capsules disposable at the plurality of manufacturing cells and configured to support a vehicular manufacturing process to assemble the vehicle, wherein the vehicular manufacturing process includes a plurality of manufacturing operations, the manufacturing system including a transport system configured to move the plurality of manufacturing capsules to the plurality of manufacturing cells, wherein the transport system includes a vertical transport system configured to longitudinally move the plurality of manufacturing capsules between the plurality of levels, the control system comprising:
a processor and a nontransitory computer-readable medium comprising instructions that are executable by the processor, wherein the instructions include:
generating vehicle assembly instructions based on the vehicular manufacturing process, one or more selected levels from among the plurality of levels, and one or more selected manufacturing cells disposed at the one or more selected levels;
defining a nominal path based on the one or more selected manufacturing cells and the one or more selected levels; and
controlling movement of the manufacturing capsules based on the nominal path.

2. The control system of claim 1, wherein the instructions further comprise controlling the movement of the manufacturing capsules based on vehicle assembly sequence instructions.

3. The control system of claim 2, wherein the vehicle assembly sequence instructions define the plurality of manufacturing operations of the vehicular manufacturing process and one or more levels from among the plurality of levels for performing the plurality of manufacturing operations.

4. The control system of claim 2, wherein the vehicle assembly sequence instructions identify a first manufacturing cell from among one or more levels of the plurality of levels for performing a first manufacturing operation of the plurality of manufacturing operations.

5. The control system of claim 4, wherein the vehicle assembly sequence instructions define a path between the first manufacturing cell and one or more additional manufacturing cells for performing additional manufacturing operations of the plurality of manufacturing operations.

6. The control system of claim 5, wherein the path is based on a comparison between a cycle time of a given manufacturing operation from among the plurality of manufacturing operations to a threshold cycle time of the given manufacturing operation.

7. The control system of claim 1, wherein the instructions further comprise controlling the movement of the manufacturing capsules based on a collision avoidance routine.

8. The control system of claim 1, wherein the vehicle assembly instructions are based on a model of the vehicle, a trim of the vehicle, a hierarchal relationship between the vehicle and one or more additional vehicles, or a combination thereof.

9. The control system of claim 8, wherein the nominal path is based on the hierarchal relationship between the vehicle and the one or more additional vehicles.

10. The control system of claim 1, wherein the one or more selected manufacturing cells include a plurality of selected manufacturing cells, and wherein the nominal path is based on a distance between the plurality of selected manufacturing cells, an aggregate cycle time of the plurality of manufacturing operations, an availability of the plurality of selected manufacturing cells, or a combination thereof.

11. The control system of claim 1, wherein the instructions further comprise controlling the movement of the manufacturing capsules based on cycle time data of the one or more selected manufacturing cells.

12. A method for controlling a plurality of manufacturing capsules to assemble a vehicle in a manufacturing system, the manufacturing system including a structure having a plurality of levels and including a plurality of manufacturing cells distributed among the plurality of levels, the manufacturing system including the plurality of manufacturing capsules disposable at the plurality of manufacturing cells and configured to support a vehicular manufacturing process to assemble the vehicle, wherein the vehicular manufacturing process includes a plurality of manufacturing operations, the manufacturing system including a transport system configured to move the plurality of manufacturing capsules to the plurality of manufacturing cells, wherein the transport system includes a vertical transport system configured to longitudinally move the plurality of manufacturing capsules between the plurality of levels, the method comprising:

generating vehicle assembly instructions based on the vehicular manufacturing process, one or more selected levels from among the plurality of levels, and one or more selected manufacturing cells disposed at the one or more selected levels;

defining a nominal path based on the one or more selected manufacturing cells and the one or more selected levels; and controlling movement of the manufacturing capsules based on the nominal path.

13. The method of claim 12 further comprising controlling the movement of the manufacturing capsules based on vehicle assembly sequence instructions.

14. The method of claim 13, wherein the vehicle assembly sequence instructions define the plurality of manufacturing operations of the vehicular manufacturing process and one or more levels from among the plurality of levels for performing the plurality of manufacturing operations.

15. The method of claim 13, wherein the vehicle assembly sequence instructions identify a first manufacturing cell from among one or more levels of the plurality of levels for performing a first manufacturing operation of the plurality of manufacturing operations.

16. The method of claim 12 further comprising controlling the movement of the manufacturing capsules based on a collision avoidance routine.

17. The method of claim 12, wherein the vehicle assembly instructions are based on a model of the vehicle, a trim of the vehicle, a hierarchal relationship between the vehicle and one or more additional vehicles, or a combination thereof.

18. The method of claim 17, wherein the nominal path is based on the hierarchal relationship between the vehicle and the one or more additional vehicles.

19. The method of claim 12, wherein the one or more selected manufacturing cells include a plurality of selected manufacturing cells, and wherein the nominal path is based on a distance between the plurality of selected manufacturing cells, an aggregate cycle time of the plurality of manufacturing operations, an availability of the plurality of selected manufacturing cells, or a combination thereof.

20. The method of claim 12 further comprising controlling the movement of the manufacturing capsules based on cycle time data of the one or more selected manufacturing cells.

* * * * *